(12) United States Patent
Kendig et al.

(10) Patent No.: US 10,816,401 B2
(45) Date of Patent: Oct. 27, 2020

(54) HYPERSPECTRAL THERMOREFLECTANCE IMAGING

(71) Applicant: Microsanj, LLC, Santa Clara, CA (US)

(72) Inventors: Dustin Kendig, Fremont, CA (US); Ali Shakouri, West Lafayette, IN (US); Hamid Piroozi, Fishers, IN (US)

(73) Assignee: MICROSANJ, LLC, Santa Clara, CA (US)

( * ) Notice: Subject to any disclaimer, the term of this patent is extended or adjusted under 35 U.S.C. 154(b) by 526 days.

(21) Appl. No.: 15/721,980

(22) Filed: Oct. 2, 2017

(65) Prior Publication Data

US 2018/0094979 A1    Apr. 5, 2018

Related U.S. Application Data

(60) Provisional application No. 62/403,193, filed on Oct. 2, 2016.

(51) Int. Cl.
| | |
|---|---|
| *G01J 3/28* | (2006.01) |
| *G01N 25/18* | (2006.01) |
| *G01J 3/32* | (2006.01) |
| *G01J 3/10* | (2006.01) |
| *H04N 5/365* | (2011.01) |
| *H04N 5/33* | (2006.01) |
| *G01J 5/02* | (2006.01) |

(Continued)

(52) U.S. Cl.
CPC .............. *G01J 3/2823* (2013.01); *G01J 3/10* (2013.01); *G01J 3/32* (2013.01); *G01J 5/0096* (2013.01); *G01J 5/025* (2013.01); *G01J 5/026* (2013.01); *G01N 25/18* (2013.01); *H04N 5/33* (2013.01); *H04N 5/3651* (2013.01); *G01J 2005/0048* (2013.01); *G01J 2005/0077* (2013.01); *H04N 17/002* (2013.01)

(58) Field of Classification Search
CPC ........ G01J 3/2823; G01J 5/0096; G01J 5/025; G01J 5/026; G01J 3/10; G01J 3/32; G01J 2005/0077; G01J 2005/0048; H04N 5/33; H04N 5/3651; H04N 17/002; G01N 25/18
See application file for complete search history.

(56) References Cited

U.S. PATENT DOCUMENTS

2008/0082288 A1*  4/2008  Raad ................... G01K 11/125
                                                        702/130

* cited by examiner

*Primary Examiner* — David P Porta
*Assistant Examiner* — Meenakshi S Sahu

(57) ABSTRACT

A method for providing a high spatial resolution thermal imaging of an active electronic device. The method includes placing an electronic device on a testing stage of an imaging system. The method, calibrating the imaging system by determining thermoreflectance coefficient for a plurality of pixels forming thermal images, each pixel having a coordinate (x,y) captured from the electronic device at each of a plurality of wavelengths of illumination ($C_{TRi}(x,y,\lambda_i)$), activating the electronic device, and determining changes in reflection for each of the plurality of pixels at each of the plurality of wavelengths ($\Delta R/R$), determining $\Delta R/R$ vs. $C_{TRi}(x,y,\lambda_i)$ for each of the plurality of pixels for each of the plurality of wavelengths, fitting $\Delta R/R$ vs. $C_{TRi}(x,y,\lambda_i)$ to a predetermined mathematical function and use the parameters to calculate the temperature at each pixel.

20 Claims, 10 Drawing Sheets

(51) Int. Cl.
*G01J 5/00* (2006.01)
*H04N 17/00* (2006.01)

HYPERSPECTRAL THERMOREFLECTANCE IMAGING

CROSS-REFERENCE TO RELATED APPLICATIONS

The present U.S. patent application is related to and claims the priority benefit of U.S. Provisional Patent Application Ser. No. 62/403,193, filed 2 Oct. 2016, the contents of which are hereby incorporated by reference in their entirety into the present disclosure.

TECHNICAL FIELD

The present application relates to non-contact thermal measurements, and more particularly to hyperspectral thermoreflectance based measurement methods and systems.

BACKGROUND

This section introduces aspects that may help facilitate a better understanding of the disclosure. Accordingly, these statements are to be read in this light and are not to be understood as admissions about what is or is not prior art.

The field of non-contact thermal imaging is associated with a variety of applications, e.g., measuring thermal characteristics of an electronic device under test. Thermal imaging using thermoreflectance has received attention in recent years. Thermoreflectance-based imaging is dependent on the measurement of the relative change in the sample's surface reflectivity as a function of temperature. As the temperature of a sample changes, the refractive index, and therefore, the reflectivity also changes. The change in reflectivity is dependent on the Thermoreflectance Coefficient, a basic material property that is a function of the illumination wavelength, the numerical aperture of the optical imaging, the sample material and material surface characteristics, and the ambient temperature. U.S. Pat. No. 7,173,245 to Shakouri et al., incorporated by reference in its entirety into the present disclosure, describes such systems and methods.

Many electronic and optoelectronic devices and integrated circuits require thermal characterization of submicron features to analyze the device thermal behavior. It is important to characterize hot spots and fully understand whether the device operation is as expected under steady-state or transient conditions. The optical response (reflection coefficient and thermoreflectance coefficient) of the semiconductor layer, metal electrode, and passivation layers are quite different. The thin layer of semi-transparent passivation material, for example, behaves as an unintentional interference filter and changes the reflection of the layer underneath.

One challenge with thermoreflectance imaging is that the surface or interface layers of samples under investigation may be made of different materials with different thermoreflectance coefficients. The current state-of-the-art system uses a single illumination wavelength that maximizes the thermoreflectance coefficient at a specific location on the device for maximum signal to noise. However, due to sample roughness, surface coating and also to sample movement, it is challenging to extract an accurate absolute temperature.

While accuracy and sensitivity of thermoreflectance is generally much higher than other competing methods, e.g., IR-based thermography, improvements can still be made in thermoreflectance-based systems where a higher spatial resolution is needed than afforded by the current state of the art.

There is, therefore an unmet need for a novel method and system that can produce higher spatial resolution and higher accuracy in thermoreflectance-based non-contact thermal imaging.

SUMMARY

A method for providing a high spatial resolution thermal imaging of an active electronic device is disclosed. The method includes placing an electronic device on a testing stage of an imaging system. The testing stage is configured to align the electronic device according to a set of coordinates and change the temperature of the electronic device. The method further includes calibrating the imaging system by determining thermoreflectance coefficient for a plurality of pixels forming thermal images, each pixel having a coordinate (x,y) captured from the electronic device at each of a plurality of wavelengths of illumination ($C_{TRi}(x,y,\lambda_i)$). Furthermore, the method includes activating the electronic device, and determining changes in reflection for each of the plurality of pixels at each of the plurality of wavelengths ($\Delta R/R$). In addition, the method includes determining $\Delta R/R$ vs. $C_{TRi}(x,y,\lambda_i)$ for each of the plurality of pixels for each of the plurality of wavelengths. The method also includes fitting $\Delta R/R$ vs. $C_{TRi}(x,y,\lambda_i)$ to a predetermined mathematical function, determining parameters of the mathematical function, and calculating temperature at each pixel.

A system for providing a high spatial resolution thermal imaging of an active electronic device is also disclosed. The system includes a testing stage for placement of an electronic device, wherein the testing stage is configured to align the electronic device according to a set of coordinates and change the temperature of the electronic device. The system also includes an illumination source configured to electively illuminate the staging stage with a plurality of wavelengths. Additionally, the system includes a processor configured to calibrate the imaging system by determining thermoreflectance coefficient for a plurality of pixels forming thermal images, each pixel having a coordinate (x,y) captured from the electronic device at each of a plurality of wavelengths of illumination ($C_{TRi}(x,y,\lambda_i)$). The processor is also configured to activate the electronic device and determine changes in reflection for each of the plurality of pixels at each of the plurality of wavelengths ($\Delta R/R$). The processor is further configured to determine $\Delta R/R$ vs. $C_{TRi}(x,y,\lambda_i)$ for each of the plurality of pixels for each of the plurality of wavelengths. The processor is also configured to fit $\Delta R/R$ vs. $C_{TRi}(x,y,\lambda_i)$ to a predetermined mathematical function, determine parameters of the mathematical function, and calculate temperature at each pixel.

DETAILED DESCRIPTION

Figure 1A:
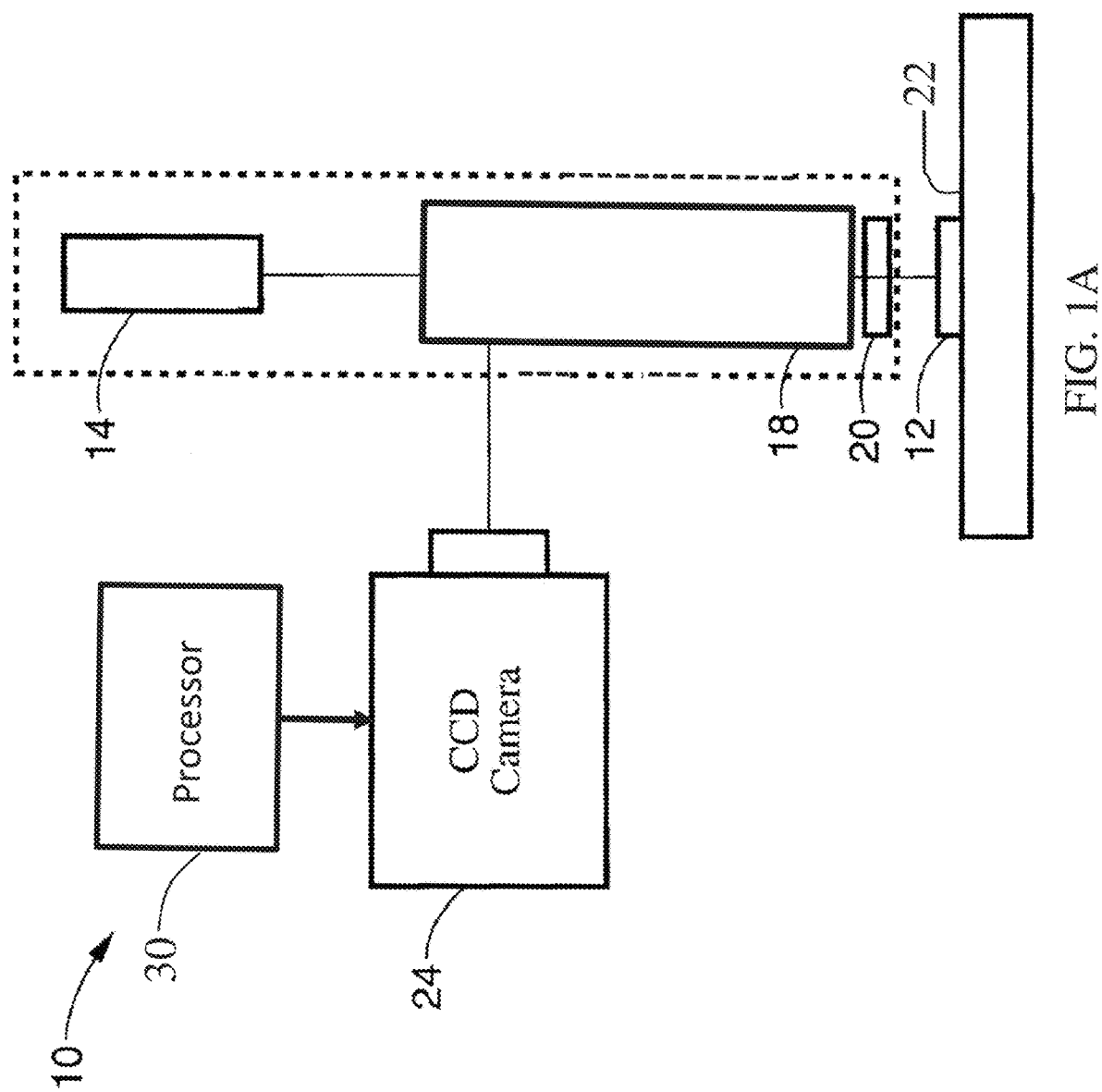
FIG. 1A is a schematic of a hyperspectral thermoreflectance imaging system including an x-y translation stage on which a sample is placed.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

A new method and system for obtaining absolute temperature maps of various samples, e.g., electronic and optoelectronic devices and integrated circuits, using the thermoreflectance imaging technique are disclosed. Fully calibrated thermal images are obtained by hyperspectral or multispectral curve fitting. Referring to FIG. 1A, a system 10 for hyperspectral thermoreflectance imaging is depicted. An illumination source is provided by laser or light emitting diode (LED) 14 whose light beam is directed onto sample 12 (device under test, or "DUT") through optical components 18, and an objective lens 20, which are all preferably located on an x-y translation stage 22. The x-y translation stage 22 is configured to position the sample 12 according to a set of coordinates and to energize the stage 22 to change the temperature of the sample 12. The reflected light is therefore split between an imager, exemplified as CCD camera 24, or other photo detectors known to a person having ordinary skill in the art. The use of CCD camera 24 within the setup allows optical positioning of the illumination, such as the spot from the laser beam, onto sample 12 while viewing the sample under test. The CCD camera 24 is in turn coupled to a processor 30 configured to control activation of the sample 12, the CCD camera 24, the x-y translation stage (both position and thermal energy) and processing, as described below. The laser or LED 14 can be a semiconductor type, e.g. from THORLABS, operating at ranges from about 500 nm to about 800 nm. The laser or LED 14 can be operating at ranges from about 1 mW to about 100 mW.

Figure 1B:
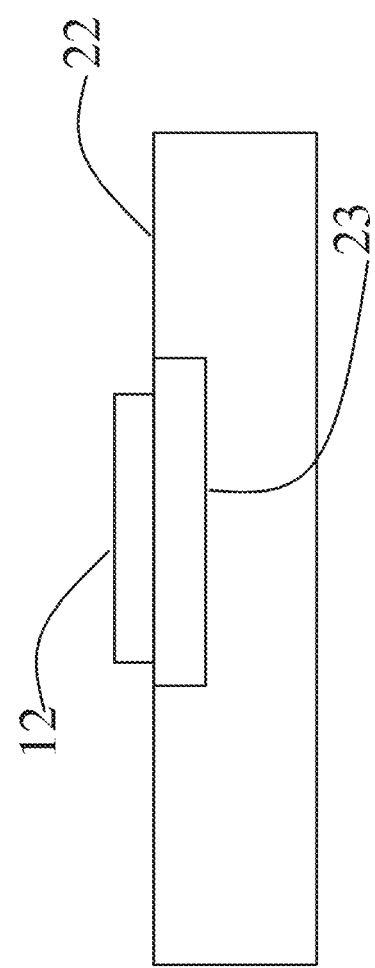
FIG. 1B is a schematic of the x-y translation stage of FIG. 1A, showing the sample and a heating/cooling element, according to the present disclosure.

Referring to FIG. 1B, a close-up schematic of the x-y translation stage 22 and DUT 12 is shown. In FIG. 1B is also a heating/cooling device 23. According to one embodiment, the heating-cooling device 23 is a thermoelectric (Peltier) device. According to one embodiment, the heating-cooling device 23 is an electric heater with coupled with a cooling device. The heating-cooling device 23 ensures that the temperature of the DUT 12 can be changed quickly (by providing thermal energy quickly and provide active cooling) in order to minimize unintended effects of natural cooling which can take a relatively long time during which time the DUT 12 is prone to movement causing significant measurement issues. Active cooling/heating can also accelerate the calibration procedure significantly.

Figure 2:
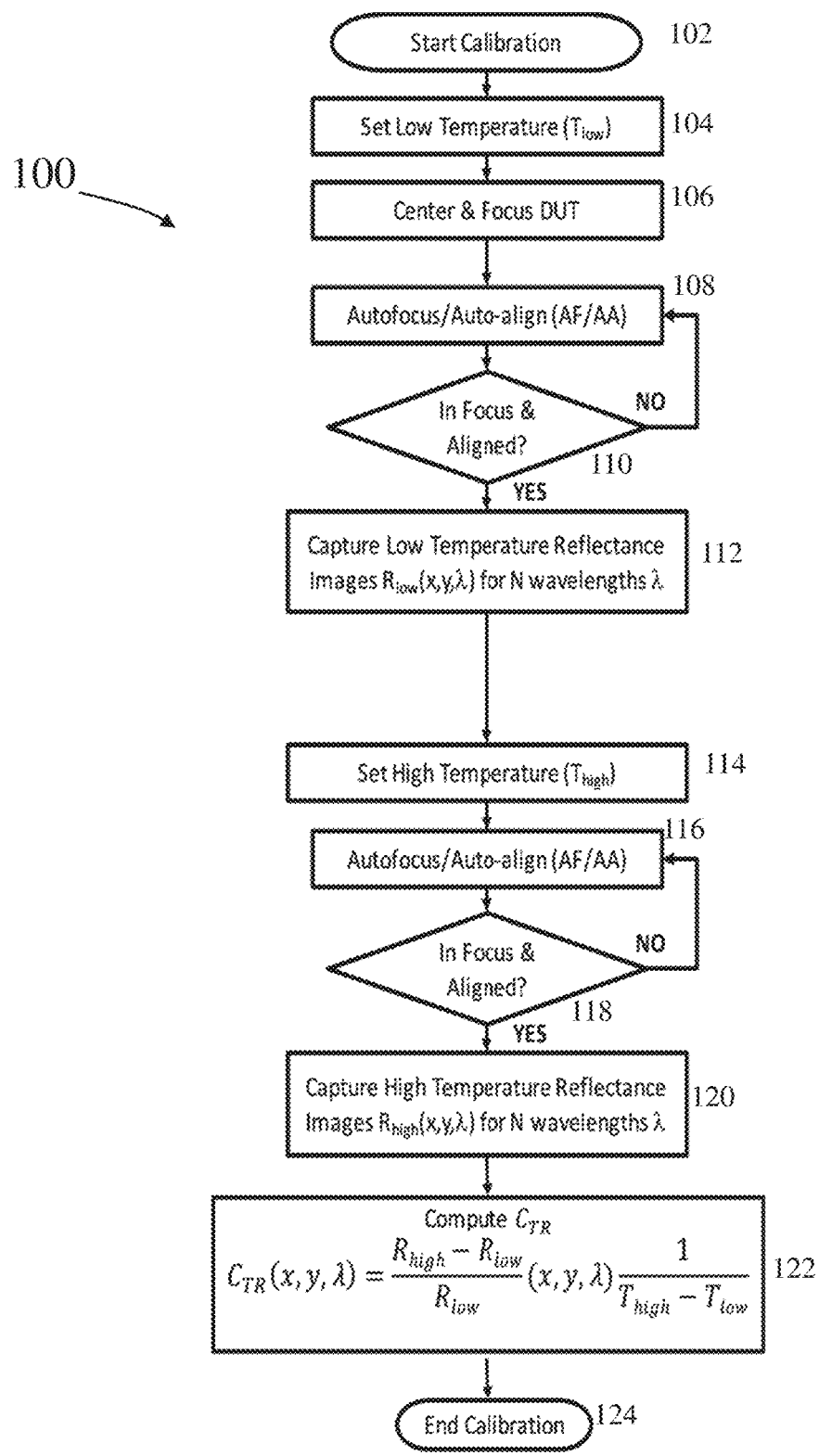
FIG. 2 is a flowchart for calibration of the system of FIG. 1A, according to the present disclosure.

Prior to measuring temperature, the system 10 must be calibrated. Referring to FIG. 2, an initial calibration procedure 100 is provided. The calibration procedure 100 begins at the start calibration block 102. Thereafter, in block 104 the processor 30 controls the x-y testing stage 22 to deliver thermal energy to the sample 12 to bring its temperature to $T_{low}$. The thermal energy is delivered by activating the heating-cooling device 23. It should be appreciated that $T_{low}$ can be room temperature, or a temperature below room temperature or above room temperature. In other words, the heating-cooling device 23 may heat or cool the sample 12 to cause it to reach the $T_{low}$. Next, the processor 30 controls the x-y testing stage 22 to center the sample 12 as the processor 30 examines images that the processor 30 commands the CCD camera 24 to capture, as provided in block 106. The processor 30 continues to control the CCD Camera 24 and the x-y testing stage 22 until the images are focused and aligned, as provided in blocks 108 and 110.

Once the autofocus and auto-alignment process is finished, the processor 30 requests the CCD Camera 24 to capture low temperature reflectance images for a plurality of pixels in a grid measured in x and y and for a plurality of wavelengths ($R_{lowi}(x,y,\lambda_i)$), as provided in block 112.

Thereafter, in block 114 the processor 30 controls the x-y testing stage 22 to deliver thermal energy to the sample 12 to bring its temperature to $T_{high}$. The thermal energy is delivered by activating the heating-cooling device 23. In other words, the heating-cooling device 23 applies thermal energy to the sample 12 to cause it to reach the $T_{high}$. Next, the processor 30 controls the x-y testing stage 22 to center the sample 12 as the processor 30 examines images that the processor 30 commands the CCD camera 24 to capture, as provided in block 116. The processor 30 continues to control the CCD Camera 24 and the x-y testing stage 22 until the images are focused and aligned, as provided in blocks 118 and 116.

Once the autofocus and auto-alignment process is finished, the processor 30 requests the CCD Camera 24 to capture high temperature reflectance images for a plurality of pixels in a grid measured in x and y and for a plurality of wavelengths ($R_{highi}(x,y,\lambda_i)$), as provided in block 120.

Next in block 122, the processor computes the thermoreflectance coefficient $C_{TR}$ based on the relationship provided in equation 1.

$$C_{TRi}(x, y, \lambda_i) = \frac{R_{highi}(x, y, \lambda_i) - R_{lowi}(x, y, \lambda_i)}{R_{lowi}(x, y, \lambda_i)} \cdot \frac{1}{T_{high} - T_{low}}, \quad (1)$$

wherein $C_{TRi}(x,y,\lambda_i)$ is the thermoreflectance coefficient of a pixel having coordinates (x,y) at wavelength $\lambda_i$. The ranges for wavelengths $\lambda_i$ are between about 300 nm to about 2000 nm. The range of temperature $T_{low}$ is between about 10° C. and about 50° C. The range of temperature $T_{high}$ is between about 20° C. and about 200° C. The difference between $T_{high}$ and $T_{low}$ ranges between about 10° C. and 100° C. The calibration process 100 ends at block 124. The calibration can be performed at cryogenic temperatures by choosing $T_{low}$ to be 4-100K or at very high temperatures (500-1000K). In both cases placing the sample inside a cryostat will help to avoid water condensation or oxidation effects. A temperature difference of a few Kelvins (1-10K) to 100K can be used to obtain the thermoreflectance coefficient with sufficient resolution and in a range where the change in reflection coefficient with temperature can be modeled based on a predetermined mathematical function.

Figure 3:
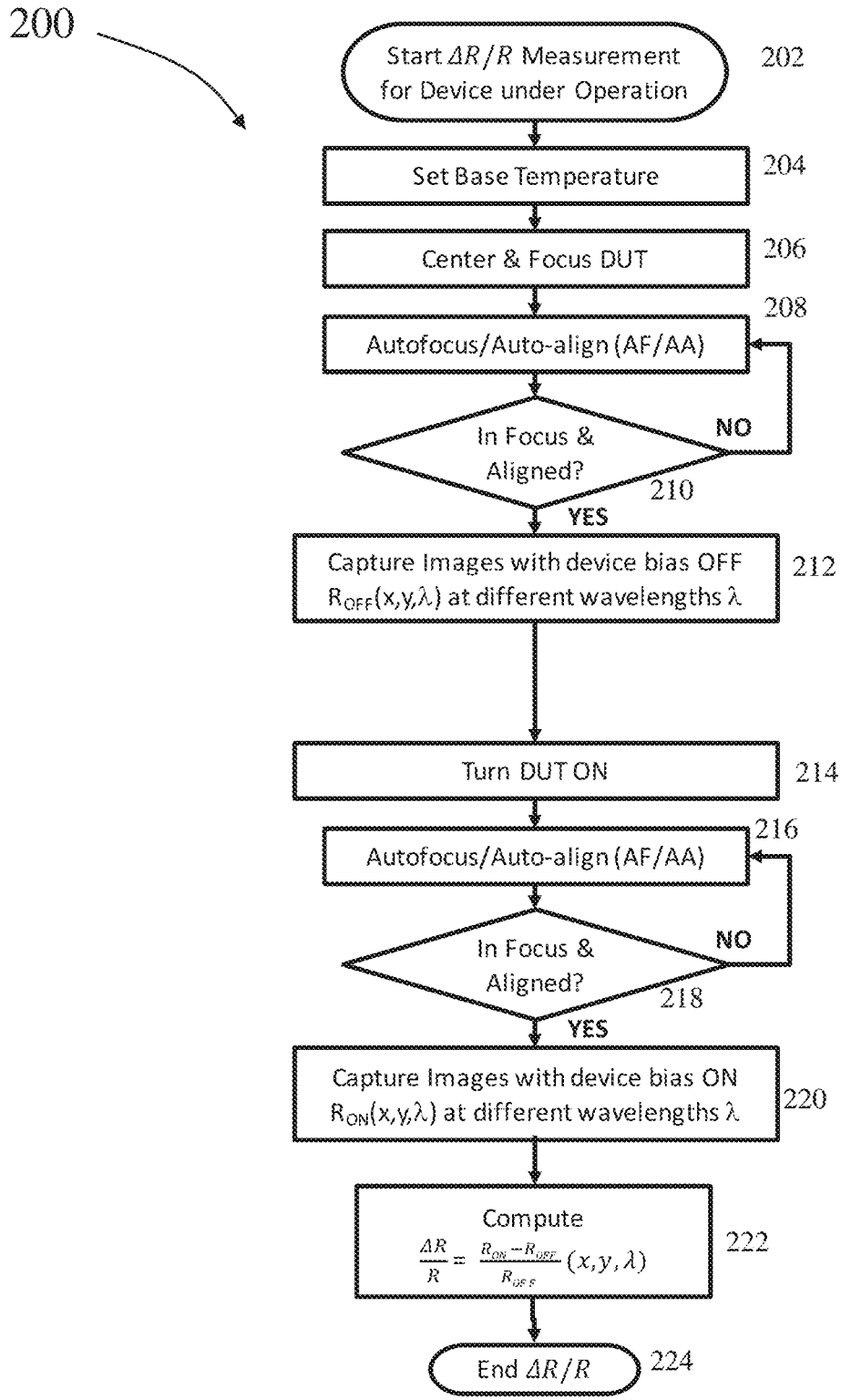
FIG. 3 is a flowchart for calibration of the system of FIG. 1A, according to the present disclosure.

Once the initial calibration is complete, the processor 30 carries out a secondary characterization process 200, as provided in FIG. 3.

Referring to FIG. 3, a secondary characterization procedure 200 is provided. The characterization procedure 200 begins at the start characterization block 202. Thereafter, in block 204 the processor 30 controls the x-y testing stage 22 to deliver thermal energy to the sample 12 to bring its temperature to $T_{off}$ while the sample 12 is in the off state. The thermal energy is delivered by activating the heating-cooling device 23. It should be appreciated that $T_{off}$ can be room temperature, or a temperature below room temperature or above room temperature. In other words, the heating-cooling device 23 may heat or cool the sample 12 to cause it to reach the $T_{off}$. It should also be appreciated that $T_{off}$ can be the same temperature as $T_{low}$ as discussed with calibration process 100. Next, the processor 30 controls the x-y testing stage 22 to center the sample 12 as the processor 30 examines images that the processor 30 commands the CCD camera 24 to capture, as provided in block 206. The processor 30 continues to control the CCD Camera 24 and the x-y testing stage 22 until the images are focused and aligned, as provided in blocks 208 and 210.

Once the autofocus and auto-alignment process is finished, the processor 30 requests the CCD Camera 24 to capture off-state temperature reflectance images for a plurality of pixels in a grid measured in x and y and for a plurality of wavelengths ($R_{offi}(x,y,\lambda_i)$), as provided in block 212.

Thereafter, in block 214 the processor 30 controls the sample 12 by activating it to an on-state. Next, the processor 30 controls the x-y testing stage 22 to center the sample 12 as the processor 30 examines images that the processor 30 commands the CCD camera 24 to capture, as provided in block 216. The processor 30 continues to control the CCD Camera 24 and the x-y testing stage 22 until the images are focused and aligned, as provided in blocks 218 and 216.

Once the autofocus and auto-alignment process is finished, the processor 30 requests the CCD Camera 24 to capture on-state temperature reflectance images for a plurality of pixels in a grid measured in x and y and for a plurality of wavelengths ($R_{ONi}(x,y,\lambda_i)$), as provided in block 220.

Next in block 122, the processor computes the $\Delta R/R$ based on the relationship provided in equation 2.

$$\frac{\Delta R}{R} = \frac{R_{ONi}(x, y, \lambda i) - R_{OFFi}(x, y, \lambda i)}{R_{OFFi}(x, y, \lambda i)}, \quad (2)$$

where $\Delta R/R$ is the relative change in temperature reflectance between the off state and the on state of the sample 12.

The secondary calibration process 200 ends in block 224.

Figure 4:
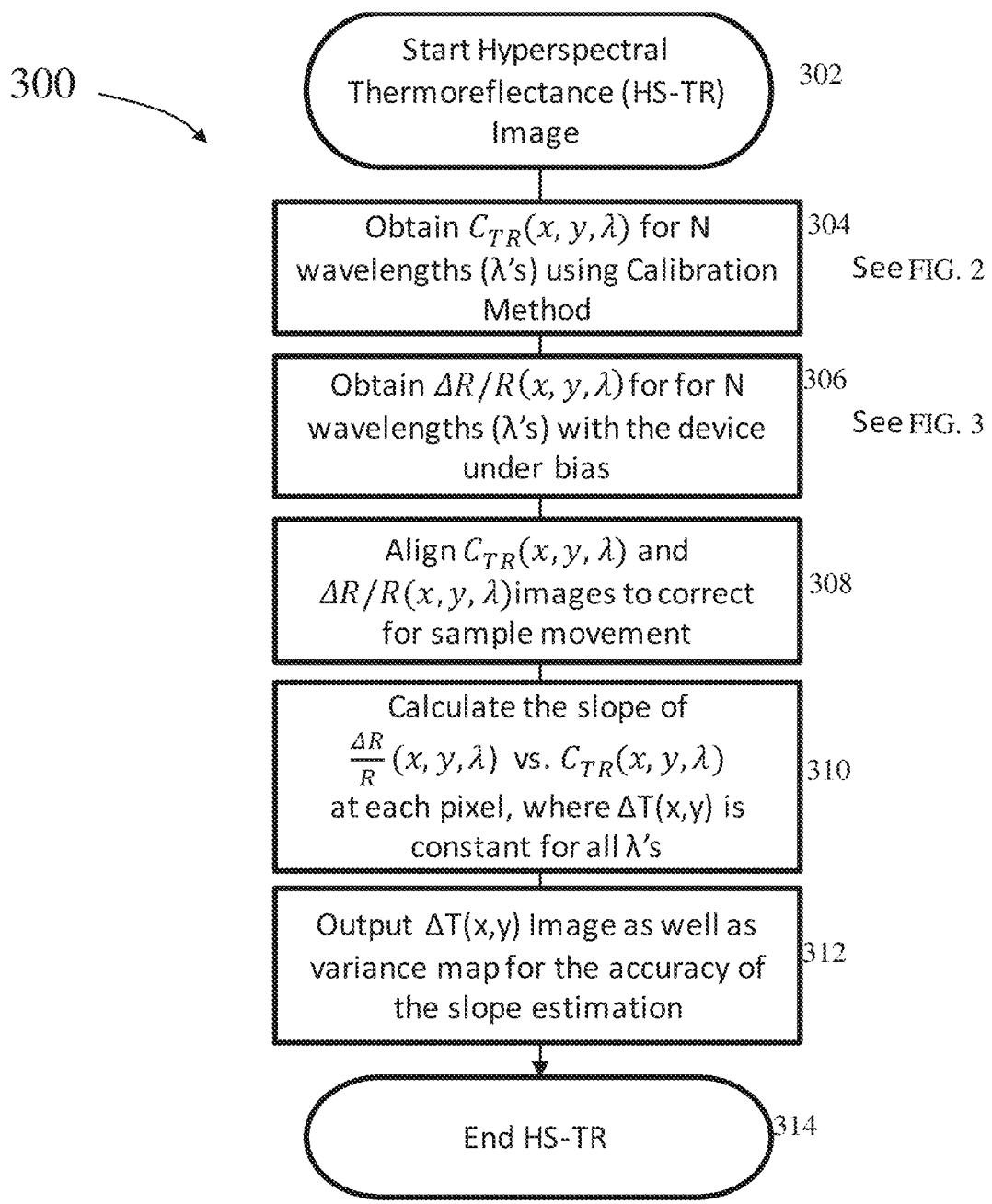
FIG. 4 is a flowchart for obtaining a hyperspectral thermoreflectance imaging output for a sample under test utilizing the system shown in FIG. 1A, according to the present disclosure.

Once the initial calibration and secondary characterization processes 100 and 200 is complete, the processor 30 carries out a hyperspectral thermoreflectance imaging process 300, as provided in FIG. 4.

Referring to FIG. 4, a hyperspectral thermoreflectance imaging process 300 begins at the start block 302. Blocks 304 and 306 represent the results from the initial and secondary calibration processes 200 and 300 provided in FIGS. 2 and 3. Thereafter, the processor 30 in block 308 controls the x-y testing stage 22 to align the images obtained in FIG. 2 and FIG. 3 to account for any sample movement. This is accomplished by an image correlation approach known to a person having ordinary skill in the art.

Next, the processor 30 calculates the slope of $$\frac{\Delta R}{R} = \frac{R_{ONi}(x, y, \lambda i) - R_{OFFi}(x, y, \lambda i)}{R_{OFFi}(x, y, \lambda i)} \text{ vs.}$$

$$C_{TRi}(x, y, \lambda_i) = \frac{R_{highi}(x, y, \lambda_i) - R_{lowi}(x, y, \lambda_i)}{R_{lowi}(x, y, \lambda_i)} \cdot \frac{1}{T_{high} - T_{low}}.$$

for each pixel having coordinates (x,y) and for each wavelength $\lambda_i$. $C_{Tri}$ is a material property that should not change so long as the range of calibrations in FIGS. 2 and 3 about the same. If the device when turned on (as in FIG. 3), results in a substantially higher temperature than the temperature achieved in the initial calibration (as in FIG. 2), then additional calibrations (as in FIG. 2) may be necessary. The difference between temperatures necessitating a new calibration depends on the material. For example, for bare semiconductor or metals typically about 100 to about 150° C. difference is acceptable; however, for phase-change material (e.g., liquid crystal), typically about 5 to about 10° C. is acceptable.

Next the processor 30 curve-fits the above relationship ($\Delta R/R$ vs. $C_{TRi}$) to a predetermined mathematical function. One such predetermined mathematical function is a linear curve (i.e., Y=mX), for which the slope represents $\Delta T$. However, other mathematical functions are possible.

Next the processor 30 outputs a temperature map $\Delta T$ for each pixel having coordinates (x,y) and a variance map associated with error representing the average fitting error for all wavelengths.

The hyperspectral thermoreflectance imaging process 300 then ends in block 314.

Figure 5:
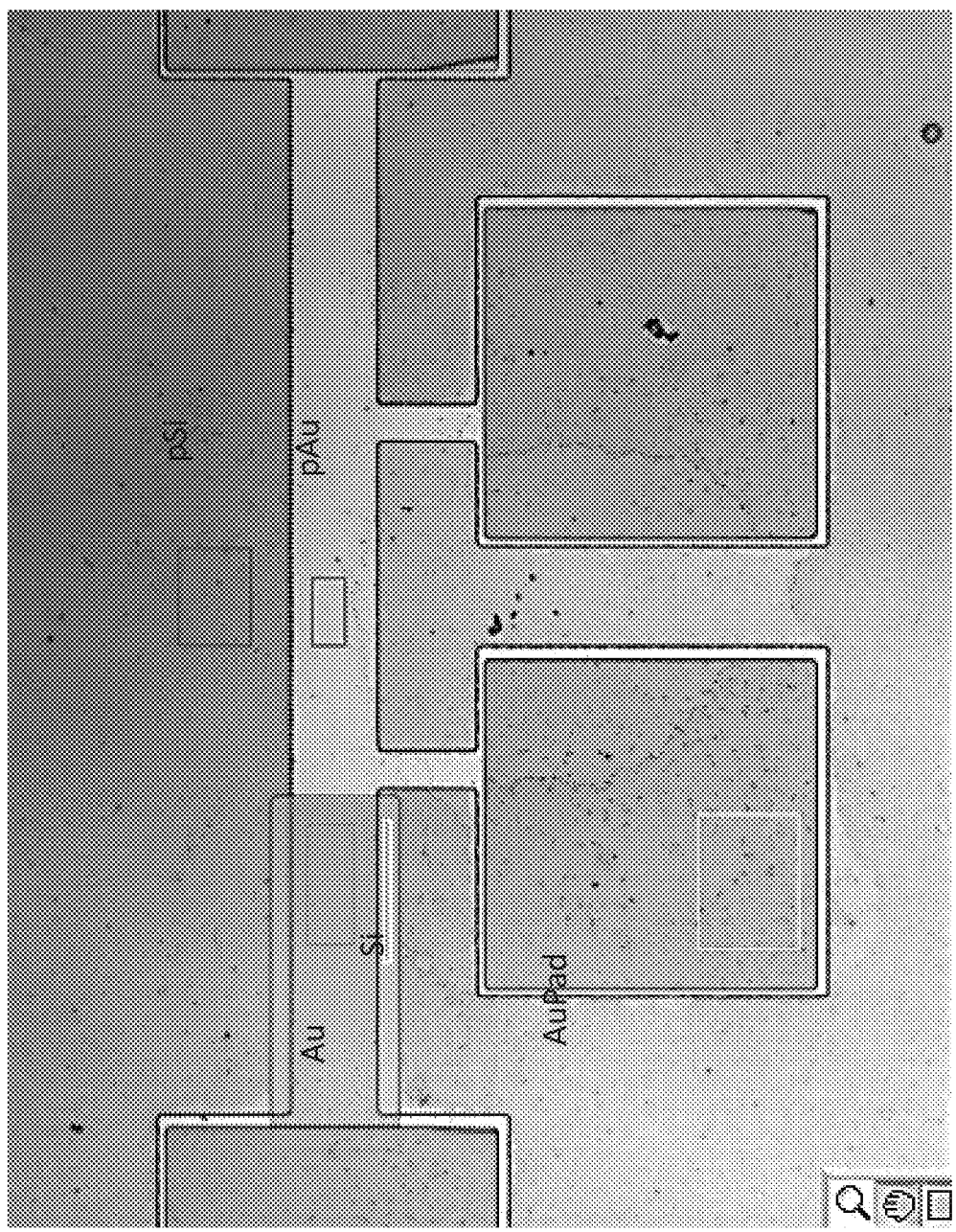
FIG. 5 is an optical image of a test sample with a gold heater deposited on a silicon substrate partially covered by a silicon nitride passivation layer, according to the present disclosure.

Referring to FIG. 5, an optical image of a test sample with a 24 microns wide gold heater deposited on a silicon substrate partially covered by a silicon nitride ($SiN_4$) passivation layer is provided. Large gold pads are prepared for the four wire measurement of sample resistivity for independent average temperature measurement. 'pSi' indicates the layer with passivation on top.

Figure 6:
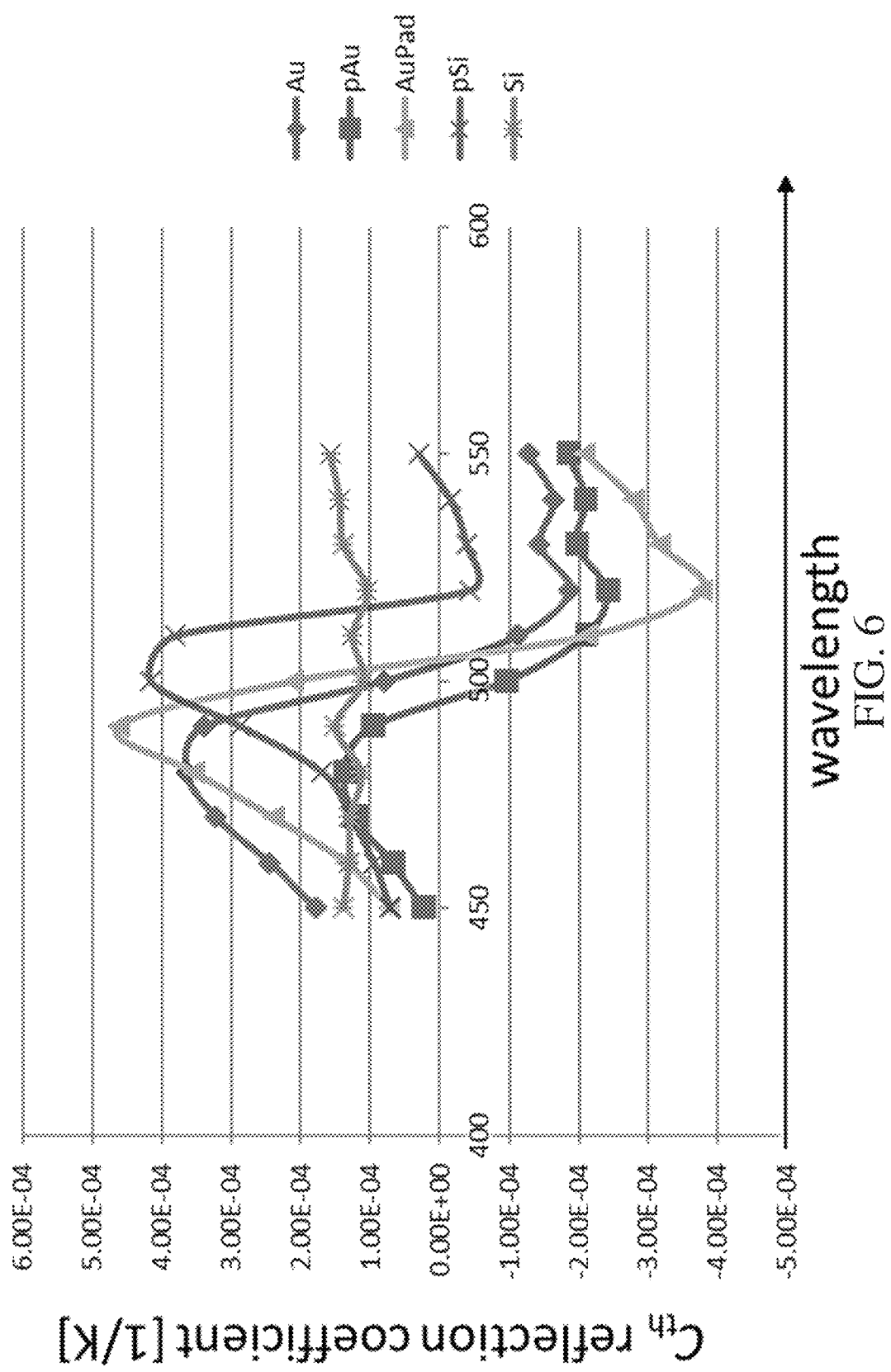
FIG. 6 is a graph of calibrated thermoreflectance coefficient $C_{TRi}$(measured in [1/K] vs. wavelength [nm] for different regions of a sample.

Referring to FIG. 6, shows calibrated thermoreflectance coefficient $C_{TRi}$ measured in [1/K] vs. wavelength [nm] for different regions are provided.

Figure 7B:
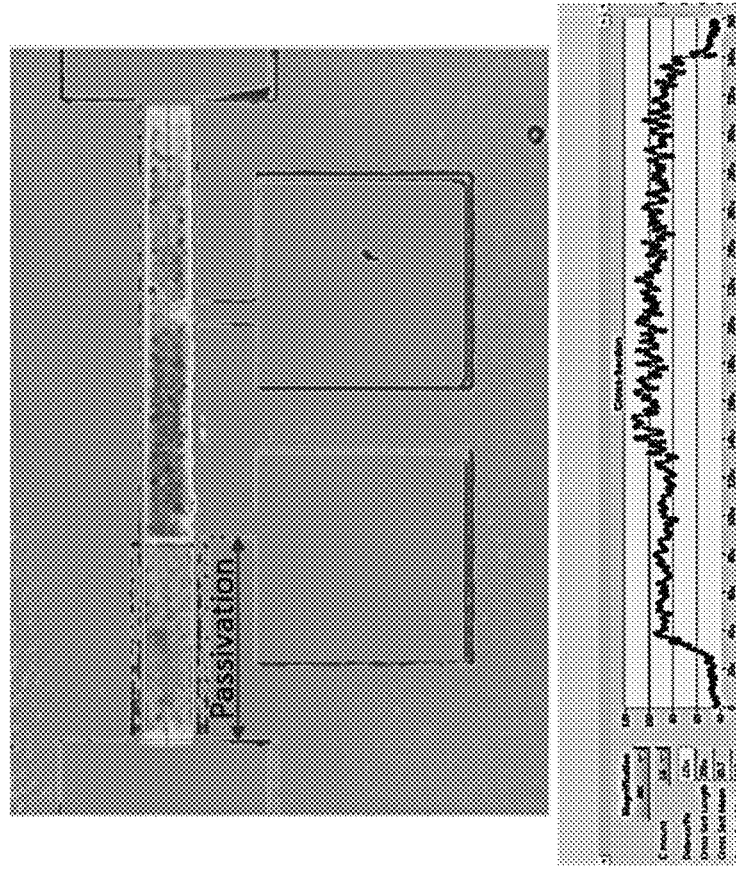
FIG. 7B is a thermal image obtained by the hyperspectral full band wavelengths of 450-550 nm for illumination, according to the present disclosure.
Figure 7A:
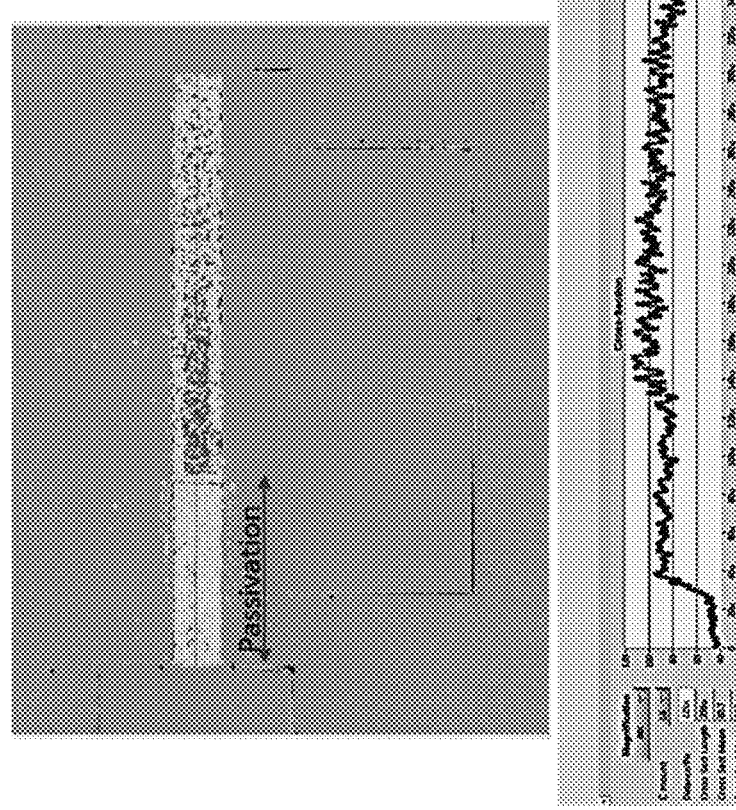
FIG. 7A is a thermal image extracted using a conventional single wavelength illumination with a state-of-the-art point-by-point calibration method.

Referring to FIG. 7A, a thermal image extracted using a conventional single wavelength illumination with a state-of-the-art point-by-point calibration method is provided. Referring to FIG. 7B, a complementary thermal image obtained by the hyperspectral full band wavelengths of 450-550 nm for illumination according to the present disclosure is provided. Of particular interest, FIG. 7A shows an apparent jump in temperature along the heater line between the passivated and unpassivated regions. This is an optical artifact since the same current is flowing through the entire uniform heater line. On the other hand, FIG. 7B obtained by the hyperspectral technique of the present disclosure shows a more precise temperature profile which is uniform along the heater line as expected.

Figure 8:
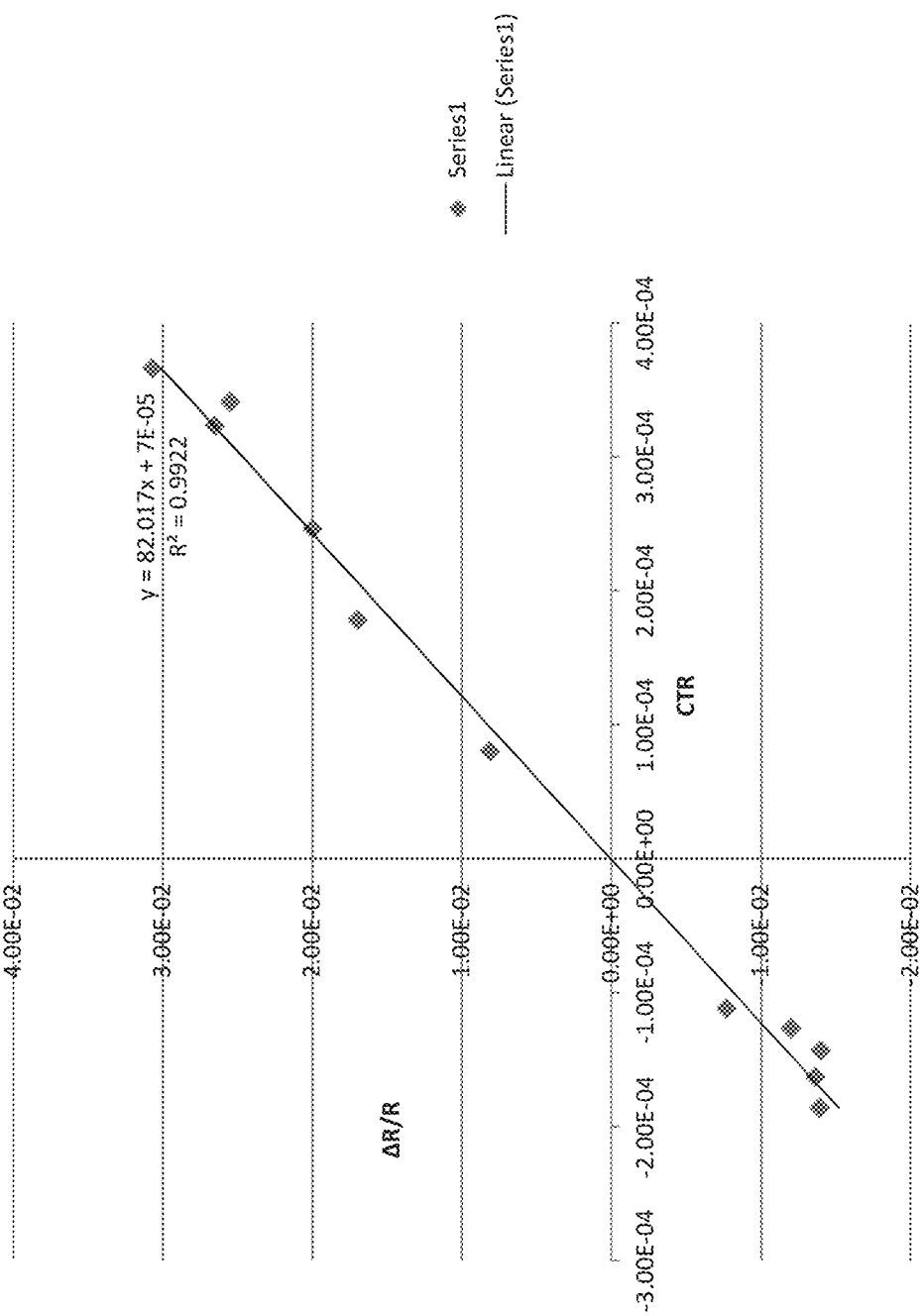
FIG. 8 is a pixel-wide graph of the relative change in temperature reflectance ($\Delta R/R$) vs. thermoreflectance coefficient ($C_{TR}$).

Referring to FIG. 8, a hyperspectral $\Delta R/R$ vs. $C_{TR}$ at a given pixel in the image is provided. In this case 10 different wavelengths ($\lambda$'s) are used. The slope of the line gives the $\Delta T$ at this pixel and standard deviations gives the error in estimating the $\Delta T$.

The hyperspectral measurement system and method of the present disclosure, provides the following advantages:

1) Hyperspectral image curve fitting provides a fully calibrated thermal image over the entire region of interest that can include different materials and surfaces finishes. By curve fitting to a predetermined mathematical function (e.g., a linear function), using all of the hyperspectral data including thermoreflectance data for each pixel at each swept wavelength and obtaining the parameters of that function, according to the teachings of the present disclosure, temperature information regarding each pixel on the surface of interest can be estimated based on the fitted curve. Temperature obtained based on initial calibration techniques described herein can be used to establish a measure of regression (R, seen in FIG. 8) representing the difference between the estimated (i.e., values from the curve fit) vs. measured temperatures. The regression value can be used to provide a degree of confidence in each pixel's temperature value.

2) Improved absolute temperature accuracy.

3) "Self-calibrating" & "self-correcting". By using the data from multiple wavelength measurements, one can verify calibration accuracy and eliminate outliers which can be affected by surface condition, thermal expansion, or other sources of error.

4) Reduced optical anomalies from devices with passivation layers (e.g., semi-transparent $Si_3N_4$, $SiO_2$, etc., on top of metal or semiconductor surfaces). Passivation layer can create surface interference for different illumination wavelengths. A slight change in the passivation layer thickness, can change the reflection coefficient and the thermoreflectance coefficient at a single wavelength significantly. Using hyperspectral technique, the surface response is more smooth and this can provide accurate pixel-by-pixel thermal maps on passivated layers.

5) All reflectance data is used to calculate the temperature change (not just the peak value of the thermoreflectance coefficient, $C_{TR}$ for a given material).

6) A map of the regression (e.g., R in FIG. 8) or "curve fitting" error can be made to show areas where there is poor fitting. This eliminates guesswork and leads to user confidence in the measurement.

Figure 9:
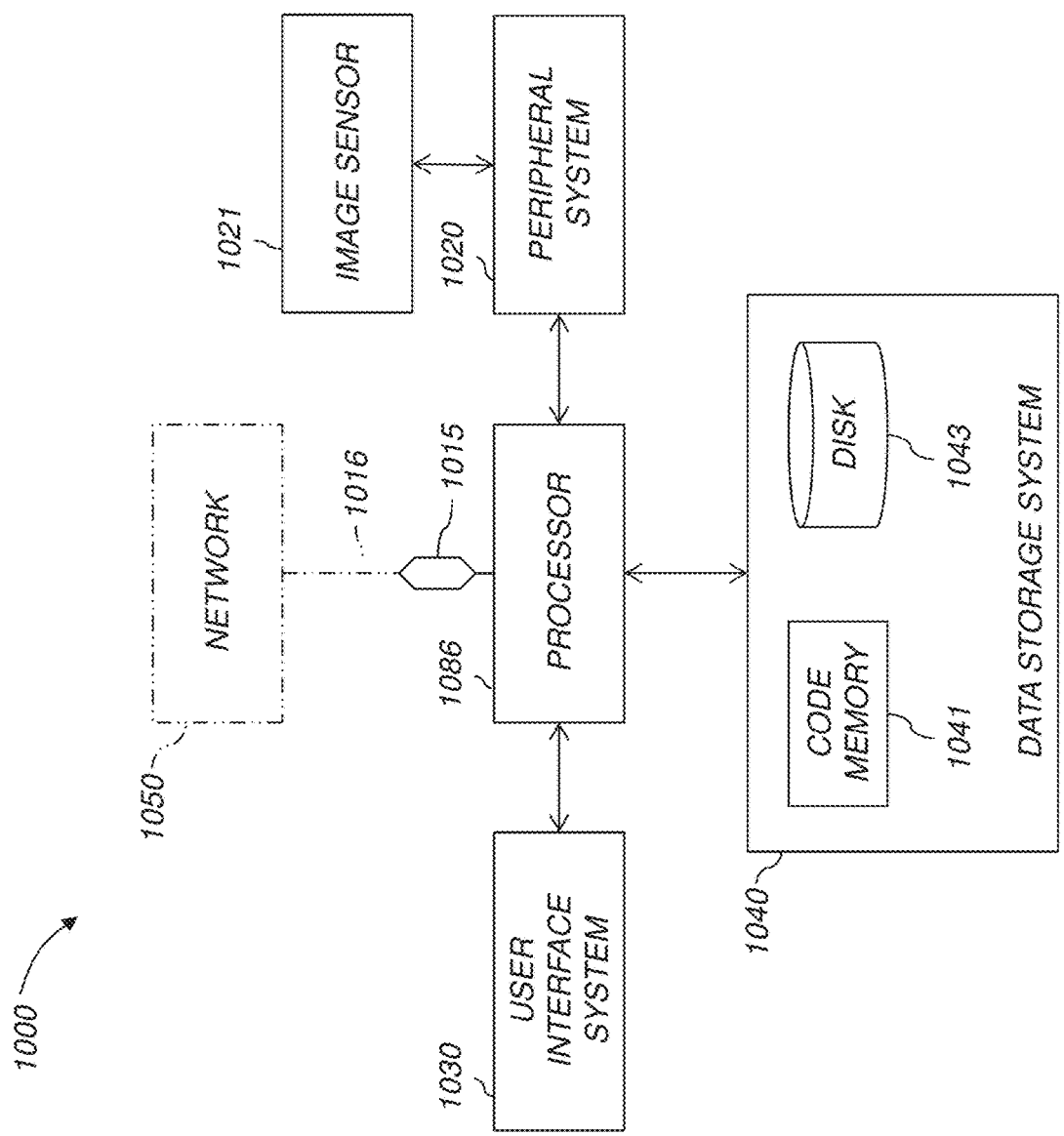
FIG. 9 is a high-level diagram showing the components of an exemplary data-processing system 1000 for analyzing data and performing other analyses described herein, and related components.

Referring to FIG. 9, a high-level diagram showing the components of an exemplary data-processing system 1000 for analyzing data and performing other analyses described herein, and related components. The system includes a processor 1086 (identified as 30 in FIG. 1A), a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those skilled in the art will recognize that numerous modifications can be made to the specific implementations described above. The implementations should not be limited to the particular limitations described. Other implementations may be possible.

The invention claimed is:

1. A method for providing a high spatial resolution thermal imaging of an active electronic device, comprising:
placing an electronic device on a testing stage of an imaging system, wherein the testing stage is configured to align the electronic device according to a set of coordinates and change the temperature of the electronic device;
calibrating the imaging system by determining thermoreflectance coefficient for a plurality of pixels forming thermal images, each pixel having a coordinate (x,y) captured from the electronic device at each of a plurality of wavelengths of illumination ($C_{TRi}(x,y,\lambda_i)$;
activating the electronic device;
determining changes in reflection for each of the plurality of pixels at each of the plurality of wavelengths ($\Delta R/R$);
determining $\Delta R/R$ vs. $C_{TRi}(x,y,\lambda_i)$ for each of the plurality of pixels for each of the plurality of wavelengths;
fitting $\Delta R/R$ vs. $C_{TRi}(x,y,\lambda_i)$ to a predetermined mathematical function;
determining parameters of the predetermined mathematical function; and
calculating $\Delta T_i(x,y,\lambda_i)$ based on the parameters for each pixel at each wavelength.

2. The method of claim 1, the step of determining the thermoreflectance coefficient includes:
activating the testing stage to cause the electronic device to reach a low temperature ($T_{low}$);
capturing low temperature reflectance for each of the plurality of pixels (x,y) and at each of the plurality of wavelengths ($R_{lowi}(x,y,\lambda_i)$); and
activating the testing stage to cause the electronic device to reach a high temperature ($T_{high}$); and
capturing high temperature reflectance for each of the plurality of pixels (x,y) and at each of the plurality of wavelengths ($R_{highi}(x,y,\lambda_i)$;
wherein the thermoreflectance coefficient ($C_{TRi}(x,y,\lambda_i)$) is obtained from the predetermined mathematical function based on change in reflectance ($\Delta R/R=(R_{highi}(x,y,\lambda_i)-R_{lowi}(x,y,\lambda_i))/R_{lowi}(x,y,\lambda_i)$) and change in temperature ($\Delta T$) for each pixel at each wavelength.

3. The method of claim 2, further comprising aligning the electronic device prior to capturing thermal images.

4. The method of claim 2, the thermoreflectance coefficient ($C_{TRi}(x,y,\lambda_i)$) is determined based on $$C_{TRi}(x, y, \lambda_i) = \frac{R_{highi}(x, y, \lambda_i) - R_{lowi}(x, y, \lambda_i)}{R_{lowi}(x, y, \lambda_i)} \cdot \frac{1}{T_{high} - T_{low}}.$$

5. The method of claim 4, further comprising determining reflection of the electronic device at an intermediate temperature while the electronic device is off for each of the plurality of pixels at each of the plurality of wavelengths ($R_{OFFi}(x,y,\lambda_i)$), wherein $\Delta R$ and $R$ in the step of fitting $\Delta R/R$ vs. $C_{TRi}(x,y,\lambda_i)$ is based on ($R_{ONi}(x,y,\lambda_i))-(R_{OFFi}(x,y,\lambda_i)$) and ($R_{OFFi}(x,y,\lambda_i)$), respectively, and $R_{ONi}(x,y,\lambda_i)$) is the reflectance of the electronic device in the activated state for each of the plurality of pixels at each of the plurality of wavelengths.

6. The method of claim 5, the intermediate temperature is $T_{low}$ and $R_{OFFi}(x,y,\lambda_i)$ is $R_{lowi}(x,y,\lambda_i)$.

7. The method of claim 1, further comprising minimizing fitting error by performing the calibrating step and the fitting $\Delta R/R$ vs. $C_{TRi}((x,y,\lambda_i)$ step as function of time for any group of neighboring pixels of the plurality of pixels associated with a structure on the electronic device.

8. The method of claim 1, further comprising providing a $\Delta T$ image for each of the plurality of pixels for each range of the wavelengths and a variance map associated with fitting error.

9. The method of claim 7, further comprising providing a $\Delta T$ image for each of the plurality of pixels for each range of the wavelengths and a variance map associated with fitting error.

10. The method of claim 1, where the fitting of $\Delta R/R$ vs. $C_{TRi}(x,y,\lambda_i)$ is to a linear curve (Y=mX).

11. A system for providing a high spatial resolution thermal imaging of an active electronic device, comprising:
a testing stage for placement of an electronic device, wherein the testing stage is configured to align the electronic device according to a set of coordinates and change the temperature of the electronic device;
an illumination source configured to selectively illuminate the staging stage with a plurality of wavelengths;
a processor configured to
calibrate the imaging system by determining thermoreflectance coefficient for a plurality of pixels forming thermal images, each pixel having a coordinate (x,y) captured from the electronic device at each of a plurality of wavelengths of illumination $(C_{TRi}(x,y,\lambda_i)$,
activate the electronic device,
determine changes in reflection for each of the plurality of pixels at each of the plurality of wavelengths ($\Delta R/R$),
determine $\Delta R/R$ vs. $C_{TRi}(x,y,\lambda_i)$ for each of the plurality of pixels for each of the plurality of wavelengths,
fit $\Delta R/R$ vs. $C_{TRi}(x,y,\lambda_i)$ to a predetermined mathematical function;
determine parameters of the predetermined mathematical function; and
calculate $\Delta T_i(x,y,\lambda_i)$ based on the parameters for each pixel at each wavelength.

12. The system of claim 11, the step of determining the thermoreflectance coefficient includes:
activate the testing stage to cause the electronic device to reach a low temperature ($T_{low}$);
capture low temperature reflectance for each of the plurality of pixels (x,y) and at each of the plurality of wavelengths ($R_{lowi}(x,y,\lambda_i)$; and
activate the testing stage to cause the electronic device to reach a high temperature ($T_{high}$); and
capture high temperature reflectance for each of the plurality of pixels (x,y) and at each of the plurality of wavelengths ($R_{highi}(x,y,\lambda_i)$;
wherein the thermoreflectance coefficient ($C_{TRi}(x,y,\lambda_i)$) is obtained from the predetermined mathematical function based on change in reflectance ($\Delta R/R=(R_{highi}(x,y,\lambda_i)-R_{lowi}(x,y,\lambda_i))/R_{lowi}(x,y,\lambda_i)$) and change in temperature ($\Delta T$) for each pixel at each wavelength.

13. The system of claim 12, the processor further configured to align the electronic device prior to capturing thermal images.

14. The system of claim 12, the thermoreflectance coefficient ($C_{TRi}(x,y,\lambda_i)$) is determined based on $$C_{TRi}(x, y, \lambda_i) = \frac{R_{highi}(x, y, \lambda_i) - R_{lowi}(x, y, \lambda_i)}{R_{lowi}(x, y, \lambda_i)} \cdot \frac{1}{T_{high} - T_{low}}.$$

15. The system of claim 14, the processor further configured to determine reflection of the electronic device at an intermediate temperature while the electronic device is off for each of the plurality of pixels at each of the plurality of wavelengths ($R_{OFFi}(x,y,\lambda_i)$), wherein $\Delta R$ and R in the step of fitting $\Delta R/R$ vs. $C_{TRi}(x,y,\lambda_i)$ is based on ($R_{ONi}(x,y,\lambda_i)$)–($R_{OFFi}(x,y,\lambda_i)$) and ($R_{OFFi}(x,y,\lambda_i)$), respectively, and $R_{ONi}(x,y,\lambda_i)$) is the reflectance of the electronic device in the activated state for each of the plurality of pixels at each of the plurality of wavelengths.

16. The system of claim 15, the intermediate temperature is $T_{low}$ and $R_{OFFi}(x,y,\lambda_i)$ is $R_{lowi}(x,y,\lambda_i)$.

17. The system of claim 11, the processor further configured to minimize fitting error by performing the calibrating step and the fitting $\Delta R/R$ vs. $C_{TRi}(x,y,\lambda_i)$ step as function of time for any group of neighboring pixels of the plurality of pixels associated with a structure on the electronic device.

18. The system of claim 11, the processor configured to provide a $\Delta T$ image for each of the plurality of pixels for each range of the wavelengths and a variance map associated with fitting error.

19. The system of claim 17, the processor configured to provide a $\Delta T$ image for each of the plurality of pixels for each range of the wavelengths and a variance map associated with fitting error.

20. The system of claim 11, where the fitting of $\Delta R/R$ vs. $C_{TRi}((x,y,\lambda_i)$ is to a linear curve (Y=mX).

* * * * *